3,049,552
Patented Aug. 14, 1962

3,049,552
FURFURYL ISOCYANATES
John D. Garber, Westfield, N.J., assignor to Merck & Co., Inc., Rahway, N.J., a corporation of New Jersey
No Drawing. Filed Nov. 3, 1960, Ser. No. 66,936
4 Claims. (Cl. 260—346.1)

This invention relates generally to isocyanates, and more particularly, to organic isocyanate compounds containing five-membered oxygen-containing heterocyclic radicals. Specifically, this invention is related to diisocyanate derivatives of furans and tetrahydro furans.

The isocyanates of this invention have the structures:

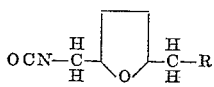

and

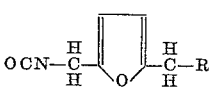

R may be an isocyanate group, or a group having one of the following structures:

(A)
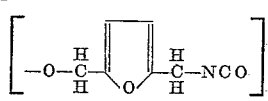

(B)
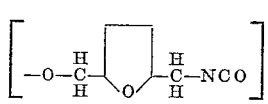

Specific embodiments of the above type of compound and the preferred embodiments of this invention are the following compounds: 5 - isocyanatomethyl - 2- furfuryl isocyanate, 5-isocyanatomethyl-2-tetrahydrofurfuryl isocyanate, oxybis (5-isocyanatomethyl-2-methylene furan), oxybis (5-isocyanatomethyl-2-methylene tetrahydrofuran).

The latter two compounds may also be named as 2,2'-oxy dimethylene bis (5-isocyanatomethyl furan), and 2,2'-oxy dimethylene bis (5-isocyanatomethyl tetrahydrofuran), respectively.

The isocyanates of this invention are useful intermediates for the manufacture of polymers such as polyurethane foams, adhesives and elastomers. The reaction of the isocyanates which are disclosed herein with a polyester such as diethylene glycol-adipic acid polyester in the presence of a suitable catalyst and water will produce a useful polyurethane resin.

Also, the reaction of the compounds of this invention with polyols, polyamines or polycarboxylic acids can be carried out to yield films, molded objects or foams. By proper choice of reactants, either flexible, rigid or intermediate structures can be produced.

It is, therefore, an object of this invention to provide diisocyanate derivatives of 2,5-dimethyl furan, 2,5-dimethyl tetrahydrofuran and oxybis compounds thereof. Further objects will be apparent from the detailed disclosure provided herein:

In accordance with my invention, I have found that diamine derivatives of 2,5-dimethyl furan, 2,5-dimethyl tetrahydrofuran, and oxybis-compounds thereof are converted to 2,5-diisocyanatomethyl furan, 2,5-diisocyanatomethyl tetrahydrofuran and oxybis compounds thereof.

The compounds of my invention may be prepared by intimately contacting hydroxymethylfurfural - derived amines with phosgene in the presence of a suitable solvent. Such solvents as chlorobenzene, ortho dichlorobenzene, bromotoluene, chlorotoluene and 4-chloro-1,3-xylene are preferred. The temperature of reaction is preferably in the range of 100° C. up to 180° C. The reaction may, however, be run at a lower temperature with an increase in the reaction time.

Phosgene addition should be started when the reaction mass is at a temperature of 10° C. or less. The reaction mass is then heated to the preferred temperature range and the temperature is maintained for the desired reaction time as phosgene is passed through the reaction mass.

Pressures up to 1,000 p.s.i. may also be applied to the system during phosgenation. Prior to the addition of phosgene carbon dioxide is preferably added to the eamine to form the carbonate salt. The formation of the carbonate salt is preferably carried out at a temperature of approximately 5° C. The reaction of phosgene with the carbonate salt is not as violent as the reaction of phosgene with the free amine. An alternate of carbon dioxide is hydrogen chloride. When hydrogen chloride gas is used the hydrochloride salt or the dihydrochloride salt is formed. The period of phosgenation and the mass rate of phosgenation is a function of the temperature and pressure at which the reaction is carried out. For example, at a temperature of 160° C. and a pressure of one atmosphere the period of phosgenation is 12 hours.

Alternatively, a specified amount of phosgene may be condensed in the reaction vessel prior to the addition of the diamine or solvent. While maintaining the vessel at a temperature in the range of from about —20° C. down to —60° C., the solvent and then the diamine are added in succession. The resulting mixture is then warmed to a temperature of about 25° C. and maintained at about 25° C. over a period of about 12 hours. The reaction mass is then heated to a temperature in the range of 100–120° C. for a period of about two hours. During this heating period, it is preferable to purge the hydrogen chloride gas formed during the reaction with an inert gas such as nitrogen. The reaction is then cooled to 25° C.

When a solid amine is used in the reaction, it is preferred that the particle size of this amine be less than 10 microns and that its surface area be greater than about 15 square meters per gram.

The diisocyanate thus formed is then separated from the solvent in the presence of which the reaction is carried out by means of evaporation of the solvent, Thus, a residue of the crude product remains. If desired, the residue so formed may further be purified as by fractional distillation of the product under reduced pressure.

The following examples are given for the purpose of illustration and not by way of limitation:

EXAMPLE 1

*Preparation of 5-Aminomethyl-2-Tetrahydrofurfuryl Isocyanate*

To 11.7 g. of 5-aminomethyl-2-tetrahydrofurfuryl amine dissolved in 165 ml. of o-dichlorobenzene an excess carbon dioxide was added. The carbon dioxide gas was bubbled through the solution for one hour during which time a gel formed. The mixture was then cooled to 5° C. and maintained below 10° C. while phosgene was added. After one hour about 10 g. of phosgene had been adsorbed with no visible evolution of hydrogen chloride. The phosgene addition was continued and the flask warmed slowly by externally applied heat. At about 50° C., the solution became clear yellow. On further heating a gel phase formed. Eventually, syneresis occurred and a more dense solid formed. Phosgene addition was continued for 12 hours at 160° C. at which time the evolution of hydrogen chloride had practically ceased. The reaction mixture was cooled and filtered. The filtrate was fractionally distilled.

After removing the o-dichlorobenzene, 8.3 g. of the desired product, 5-aminomethyl-2-tetrahydrofurfuryl isocyanate, was obtained as a clear, colorless liquid (B.P 105° C./0.5 mm.). I.R. measurements of the product showed an intense isocyanate band at 4.5µ. Analytical data for $C_8H_{10}N_2O_3$ were as follows:

|  | Percent Calculated | Percent Found |
|---|---|---|
| Carbon | 52.7 | 52.76 |
| Hydrogen | 5.53 | 5.26 |
| Nitrogen | 15.37 | 15.63 |

EXAMPLE 2

Preparation of 5-Aminomethyl-2-Tetrahydrofurfuryl Isocyanate

A suspension of 16.5 g. of 5-aminomethyl-2-tetrahydrofurfuryl amine dihydrochloride in 150 ml. of o-dichlorobenzene was prepared. An excess of phosgene was added to the suspension slowly while the suspension was maintained at 10° C. The slow rate of phosgene addition was continued, and the temperature was raised to 155° C. in 45 minutes. After about 14 hours at 155–160° C., hydrogen chloride evolution had practically stopped. The batch was cooled and filtered. The solvent was removed at 60° C./10 mm. The diisocyanate fraction was collected at 105° C./0.5 mm. A yield of 81% of theory (12.06 g.) of colorless liquid 5-aminomethyl-2-tetrahydrofurfuryl isocyanate was obtained, $n_D^{27} = 1.4710$.

EXAMPLE 3

5-Isocyanatomethyl-2-Furfuryl Isocyanate

A suspension of 19.9 g. of 5-aminomethyl-2-furfuryl amine dihydrochloride in 275 cc. of orthodichlorobenzene was prepared. Phosghene was passed into the suspension while it was maintained at 5° C. until a total of 16 g. of phosgene was absorbed. The slurry was then heated to 155–160° C., continuing a slow addition of phosgene. At 75° C. the evolution of hydrogen chloride began. The slurry gradually dissolved and after 10 hours at reaction temperature, the dark reaction mixture was filtered and the filtrate distilled. Dichlorobenzene was removed at about 30° C./0.5 mm. and the product cut taken at 76.2–77.5° C./100 microns. A 78.6% yield of a slightly yellow liquid, 5-isocyanatomethyl-2-furfuryl isocyanate, was obtained, $n_D^{27} = 1.4973$; UV: $\lambda_{max}$. 2700, E% 2.14; $\lambda_{max}$. 2205, E% 502. The analytical data are as follows:

|  | Percent Calculated ($C_8H_6N_2O_3$) | Percent Found |
|---|---|---|
| Carbon | 53.93 | 54.09 |
| Hydrogen | 3.40 | 3.47 |
| Nitrogen | 15.73 | 16.09 |

EXAMPLE 4

Oxybis (5-Isocyanatomethyl-2-Methylene Tetrahydrofuran)

Approximately 150 ml. of liquid phosgene was condensed in a 200 ml. flask maintained at about −50° C. To this was added with stirring 650 ml. of dry chlorobenzene. 15.57 g. of bis-(5-aminomethyl tetrahydrofurfuryl) ether (diamine B) was then dissolved in 130 ml. of dry chlorobenzene. The resulting solution was mixed with phosgene solution. The latter addition was effected at −50° C. over a 10–15 minute period. A clear, slightly yellow mixture was obtained. This mixture was allowed to warm to room temperature over a 12-hour period and then slowly heated to 110° C. (2 hours). The reaction mixture was maintained at this temperature for 1–2 hours while bubbling dry nitrogen through the system to sweep out hydrogen chloride. After cooling to 0° C. and holding overnight, the clear liquid was decanted from a small amount of insoluble material, and the solvent was removed. Fractional distillation yielded 7.6 g. (38% yield) of the desired bis-(5-isocyanatomethyl tetrahydrofurfuryl) ether. The physical constants for this compound are as follows: $n_D^{25} = 1.4812$, sp. gr. = 1.028 g./ml., I.R. shows intense band at 4.42–4.58µ (NCO) and strong absorption at 9.2µ (C—O—C). Analysis:

|  | Percent C | Percent H | Percent N |
|---|---|---|---|
| Calc. for $C_{14}H_{20}O_5N_2$ | 56.74 | 6.80 | 9.46 |
| Found | 56.72 | 6.94 | 9.35 |

Any departure from the above description which conforms to the present invention is intended to be included within the scope of the claims.

What is claimed is:
1. 5-isocyanatomethyl-2-furfuryl isocyanate.
2. 5-isocyanatomethyl-2-tetrahydrofurfuryl isocyanate.
3. 2,2′-oxy dimethylene bis (5-isocyanatomethyl furan).
4. 2,2′-oxy dimethylene bis (5-isocyanatomethyl tetrahydrofuran).

References Cited in the file of this patent
UNITED STATES PATENTS

| 2,680,127 | Slocombe et al. | June 1, 1954 |
| 2,847,440 | Bloom et al. | Aug. 12, 1958 |
| 2,875,226 | Bloom et al. | Feb. 24, 1959 |

UNITED STATES PATENT OFFICE
CERTIFICATE OF CORRECTION

Patent No. 3,049,552                                    August 14, 1962

John D. Garber

It is hereby certified that error appears in the above numbered patent requiring correction and that the said Letters Patent should read as corrected below.

Column 2, lines 54 and 55, for "5-Aminomethyl-2-Tetrahydrofurfuryl Isocyanate", in italics, read -- 5-Isocyanatomethyl-2-Tetrahydrofurfuryl Isocyanate --, in italics; column 3, line 2, for "5-aminomethyl-" read -- 5-isocyanatomethy- --; lines 16 and 17, for "5-Aminomethyl-2-Tetrahydrofurfuryl Isocyanate", in italics, read -- 5-Isocyanatomethyl-2-Tetrahydrofurfuryl Isocyanate --, in italics; same column 3, line 29, for "5-amino-" read -- 5-isocyanato- --.

Signed and sealed this 31st day of December 1963.

(SEAL)
Attest:
ERNEST W. SWIDER

EDWIN L. REYNOLDS

Attesting Officer                                                Acting Commissioner of Patents